US012611794B2

(12) United States Patent
Xie

(10) Patent No.: US 12,611,794 B2
(45) Date of Patent: Apr. 28, 2026

(54) METHOD AND APPARATUS FOR PRODUCING ENGINEERED STONE SLABS

(71) Applicant: Alex Xie, West Windsor, NJ (US)

(72) Inventor: Alex Xie, West Windsor, NJ (US)

(73) Assignee: SQIP, LLC, Orlando, FL (US)

( * ) Notice: Subject to any disclaimer, the term of this patent is extended or adjusted under 35 U.S.C. 154(b) by 0 days.

(21) Appl. No.: 19/414,417

(22) Filed: Dec. 10, 2025

(65) Prior Publication Data

US 2026/0091532 A1 Apr. 2, 2026

Related U.S. Application Data

(62) Division of application No. 18/736,262, filed on Jun. 6, 2024, now Pat. No. 12,528,227.

(51) Int. Cl.
*B29C 67/00* (2017.01)
*B28B 1/00* (2006.01)
*B28B 3/12* (2006.01)

(52) U.S. Cl.
CPC .............. *B28B 1/005* (2013.01); *B28B 3/123* (2013.01)

(58) Field of Classification Search
CPC ................................ B28B 1/005; B28B 3/123
See application file for complete search history.

(56) References Cited

U.S. PATENT DOCUMENTS 9,707,698 B1 * 7/2017 Xie .......................... B28B 1/005
2019/0105800 A1 * 4/2019 Xie .......................... B28D 1/24

* cited by examiner

*Primary Examiner* — Nicholas Krasnow
(74) *Attorney, Agent, or Firm* — Walter J. Tencza, Jr.

(57) ABSTRACT

A method for producing engineered stone slabs including steps of depositing a composite material onto a supporting structure; disrupting the composite material using a plurality of stirring devices attached to a shifting structure; depositing colorant in a predefined region in the composite material using a spray device to form a colored disrupted composite material; and using a first device to press, flatten and stretch the composite material into a slab after disrupting and depositing colorant. The step of disrupting may occur before, after, or during the step of depositing colorant. The step of disrupting the composite material or the step of depositing colorant may include causing the shifting structure to move along a width of the supporting structure. Prior to depositing the composite material onto the supporting structure, and after compressing the composite material, the composite material may be fragmented into a plurality of fragments of composite material.

7 Claims, 17 Drawing Sheets

METHOD AND APPARATUS FOR PRODUCING ENGINEERED STONE SLABS

CROSS REFERENCE TO RELATED APPLICATIONS

The present application is a divisional of and claims the priority of U.S. patent application Ser. No. 18/736,262, filed on Jun. 6, 2024, inventor and applicant Alex Xie. The entire disclosure of the above application is incorporated herein by reference.

FIELD OF THE INVENTION

The present application is related to methods and apparatuses for producing engineered stone slabs.

BACKGROUND OF THE INVENTION

Quartz is the second most abundant mineral in the Earth's crust and one of the hardest naturally occurring materials. One of its many uses is in "engineered stone". Engineered stone, including quartz, has become a common surfacing and countertop choice in many countries throughout the world. Its applications include kitchen and bathroom countertops, tables and desktops, floor tile, food service areas, wall cladding, and various other horizontal and vertical applications. The production of engineered stone generally involves particulate materials such as ground quartz rock, crushed glass, rocks, pebbles, sand, shells, silicon, and other inorganic mineral materials combined with polymers, binders, resins, colorants, dyes, etc. The particulate material(s) may be varying sizes ranging from four hundred mesh particle size to four mesh particle size with multiple materials of different sizes used simultaneously. The polymer(s) may include agents such as a binder, hardener, initiator, or combination of such. Engineered stone may also be water based as opposed to polymer based. The particulate material(s) and polymers, binders, resins, colorants, dyes, etc. are then mixed resulting in a slightly damp mixture. This initial mixture may be processed through a crushing machine to reduce the size of the combined particles. The resultant, finer mixture may be evenly distributed into a supporting mold, tray, or other supporting structure. The mixture may also be slightly compressed to make the surface of the distributed material flatter and smooth. The mold or tray containing the damp mixture is then moved onto a conveyor belt with a backing sheet, then a processed damp "slab" is moved into a vacuum press machine to compress the material. The compressed material is then placed into a curing machine to be heated into a hardened quartz slab. After curing, the hardened slab is generally moved to a grinder to be grinded down to a desired thickness, followed by a polisher to finish the product.

Quartz based stone has many advantages over natural stone such as marble and granite. Compared to these natural stones, quartz is harder, stronger, less water absorbent, and more resistant to staining, scratching, breakage, chemicals, and heat. One of the drawbacks of quartz is its perceived lack of natural, random looking veins and color patterns compared with natural stones.

There are various known methods, apparatuses, and system for producing an engineered stone slab with color patterns and veining similar to natural stone.

In various such known methods, a composite material is mixed which may include or may consist of particulate stone or minerals, quartz, glass, shells, or silicon mixed with polymer resins, dyes, binders, hardeners, initiators, or any combination of such previously mentioned materials. The composite material can vary based on a number of factors such as particulate size, resin percentage, colorants used, or composition. Notably colorant mixtures of resin and colorant, or only colorant in either liquid, powder or other particle format may be considered a composite mixture. This composite material or plurality of composite materials may undergo a process as disclosed in US patent U.S. Pat. No. 10,376,912B2, which is incorporated by reference herein, to achieve a natural stone aesthetic. Prior to or subsequently, the composite material may undergo further processes such as disclosed in U.S. Pat. Nos. 9,707,698 B1 and 10,843,977 B2 to Xie, which are incorporated by reference herein.

U.S. Pat. No. 9,707,698 B1 by Xie discloses a process in which the composite materials undergo a process consisting of layering, compressing, and disrupting the composite material or plurality composite materials in order to achieve a natural stone aesthetic. The prior art discloses processes in which prior to compressing the composite materials by a manner such as using a press roller, the composite material may be manipulated either by slightly pressing the composite material, disrupting the composite material, or using a gate device in order to scrape any excess material to achieve a layer of a substantially flat or smooth top surface of the composite material.

In the prior art such as US application US20220048216A1 by Toncelli, it is specifically mentioned that different materials are laid on top of each other on a substantially flat surface. The materials are then pressed or sandwiched together. The material is then folded and pressed again. This will lead to a layer of colorant that is substantially on the same substantially horizontal plane of the material, and not cause any blending or deformation in the vertical direction.

In the prior art such as U.S. Pat. Nos. 9,707,698B1 and 10,843,977 by Xie, the colorant or differently colored composite mixtures are contained within each fragment. Therefore, the vein length after undergoing compression such as through a press roller will not extend to connect various other fragments. In addition, these methods are not able to achieve desired wave patterns as apparent in some of natural stones such as travertine or layered onyx.

SUMMARY OF THE INVENTION

One or more embodiments of the present invention provide methods and apparatuses for producing an engineering stone slab, in which composite material is squeezed and compressed into a flat uncured slab by a press roller or a pair of press rollers. In at least one embodiment, the composite material may be significantly varied in fragment size in order to achieve a more realistic natural stone aesthetic.

In at least one embodiment of the present invention, aggregate minerals such as quartz grits and powder may be combined with resin, colorant and other additives in a high-speed mixer to obtain a mixture of damp composite material. This mixture of damp composite material may be deposited onto the surface of a supporting structure such as a rubber mold or a separation sheet such as a polyethylene terephthalate (PET) film on top of a conveyor belt. A shifting structure, which may be comprised of two or a further plurality of stirring devices attached to it may be used to disrupt the composite mixture. Each of the plurality of stirring devices may be a device equipped with one or more rotatable prongs. The shifting structure may be positioned along the width of a conveyor belt. A distance between each stirring device may be specified according to a desired final aesthetic. Each of the plurality of stirring devices may be equipped with a means for moving any individual stirring device along the shifting structure. The shifting structure may move along the width of the conveyor belt, thereby repositioning all the stirring devices at the same time.

The shifting structure may be lowered so that the plurality of stirring devices are inserted into the composite mixture. As the composite mixture is transferred by the conveyor belt, the stirring devices disrupt the composite mixture. The region of the composite mixture that is disrupted by each stirring device may be adjusted by the spacing between each stirring device, the width covered by the rotation of any individual stirring device, and the rotational speed of each stirring device. Colorant may be deposited into the disrupted regions of the composite mixtures by a variety of methods such as a single or a plurality of spray devices while the stirring devices are disrupting the composite mixtures in order to simulate veining in natural stone. Spray devices may also be positioned upstream or downstream to deposit colorant before or after the composite mixtures are disrupted by the stirring devices. The amount of colorant deposited at any given point may be controlled depending on the desired final design of the slab. More than one kind of colorant may be deposited at any given region, and these multiple colorants may or may not be deposited at the same time. The amount of each colorant to be deposited may be controlled by a computer or computer processor, or adjusted manually.

If the shifting structure is moved back and forth along the width of the conveyor belt as the conveyor belt transfers the composite mixtures downstream, the stirring devices will carve parallel s-shaped or wave shaped patterns in the composite mixtures. Depending on the design requirements, the distance the shifting structure moves back and forth and the speed at which it moves can be controlled, such as by a computer or computer processor. This, along with controlling the belt travel speed, will result in different S-shaped or wave shaped patterns in the processed material.

After the composite mixtures pass through the stirring and colorant dispensing devices, the composite mixture may then be compressed using a press roller to press, flatten and stretch the composite mixtures into an uncured slab with the pattern of the colorant embedded within the slab. This uncured slab may then be trimmed to the dimensions of the desired final slab length, and then sent to a vacuum and compression machine for further processing. In at least one embodiment of the present invention, the composite mixture may be slightly pressed after being deposited onto the supporting structure into a compressed composite material in the form of an uncured slab with a flatter surface prior to being disrupted by the stirring device or devices. This initial pressing may be performed by a first press roller or pair of press rollers and referred to as a first stage press. The composite material may be compressed by about 10%-20% by volume during the first stage press and may still have air pockets within the compressed composite material. The stirring devices then proceed to fragment the compressed composite material and spray devices apply colorant to the disrupted regions of the composite material, which is subsequently compressed using a press roller to press, flatten and stretch the fragments into an uncured slab with the colorant veining embedded within the slab. This second pressing may be performed by a first press roller or pair of press rollers and referred to as a stretch press, in which the compressed composite material is stretched and much more compressed compared to the first stage press. Notably, both the first stage press and stretch press processes may be performed by a press roller or pair of press rollers, with the differentiation between the two processes being how much stretching and compressing occurs at each step.

In at least one embodiment of the present invention, the composite material may be compressed into a condensed composite mixture. After the known condensed composite material is formed, the condensed composite material is broken into a plurality of fragments in a controlled manner such as by a stirring device to disrupt the condensed composite mixture in which the rotational speed of the stirring device may vary so that the faster the stirring device rotates to break the condensed composite material, the smaller the fragments will be. Alternatively, the condensed composite mixture may be dropped onto a rigid grid or sieve. By controlling the rigid grid or sieve size and/or height of the drop, it is possible to obtain fragments of a desired size or sizes. There are other means of obtaining these desired sized fragments.

These random shaped fragments of composite material are then evenly and/or loosely deposited onto a supporting structure such as a conveyor belt so that there is not substantially more composite material in one region compared to another. An inelastic separation sheet, for example a sheet of polyethylene terephthalate (PET) film, may be used to separate the conveyor belt from the damp mixtures or the damp fragments. Ideally there are no regions where smaller fragments are significantly piled up next to a large fragment, thereby blocking the side walls of the large fragment from having colorant deposited onto it. In general, any region of square foot should not have 50% more material than another square foot region. In addition, if the random shaped fragments are piled up too high, the pressure may begin to compress the fragments together and lose their shape.

The advantage of processing and depositing the random shaped fragments composite material in this manner is that as the stirring devices disrupt the fragments and colorant is applied, the colorant will be applied also to the side walls of the random shaped fragments. These side walls may be random shapes as opposed to smooth, flat surfaces. This leads to a greater surface area in which the colorant layer is applied compared to uncompressed composite material in which the particle size is significantly smaller. A higher rotational speed of the stirring device may partially break some of the fragments while a significantly lower rotational speed of the stirring device may just shift the fragments without breaking them.

When using the press roller or pair of press rollers in an alternative method, the amount of composite mixture or the number of random shaped fragments may vary, and the height of the composite mixture or random shaped fragments distributed onto the belt may be greater or much greater than the specified distance between the press roller or pair of press rollers and the belt. Therefore, when the composite mixture or random shaped fragments are fed through the press roller, there will be an accumulation of material at the front of the press roller. The height of this accumulation may be controlled by a number of factors including belt speed, press roller rotational speed, height or average height of the composite mixture or random shaped fragments distributed on the belt, and distance between the press roller and the belt. The composite mixture or random shaped fragments will be squeezed by the roller and deformed into one piece to form a flat slab once it passes through the roller. In the case of embodiments having random shaped fragments, the larger random shaped fragments also have a tendency to be squeezed upstream, away from the press roller more towards regions with smaller or less random shaped fragments, therefore elongating and shifting the vein pattern created by the colorant deposited on the side walls of the random shaped fragments.

Notably while covering more surface area of any particular random shaped fragment is desirable, coating more of the side walls, or vertical surfaces, of a random shaped fragment is also important, depending on the desired final design aesthetic. The press roller has a tendency to substantially stretch the damp composite mixture or the damp random shaped fragments in the horizontal direction, but very little stretching in the vertical direction. Therefore, if colorant is only on the top surface of the composite mixture or random shaped fragments, or if the composite material or random shaped fragments are slightly pressed with a flat top surface, the colorant will substantially remain on the top surface after passing through the press roller. For example, if a random shaped fragment has significantly more horizontal surface area such as a flat disc, all the colorant on the top surface of the disc will remain substantially on top after passing through the press roller. This will lead to the colorant appearing on the horizontal top surface of the slab as opposed to having a through bodied appearance in the vertical direction. If however the random shaped fragment is a cylinder with more height than width and colorant is applied throughout the height of the side walls, the colorant on the randomly shaped vertical surface will elongate in the horizontal direction after passing through the press roller and deformed. The subsequent appearance of the slab will not only have visible colorant veining on the horizontal surface, but also will have random veining through the body of the slab in the vertical direction.

There are other methods aside from press rollers in order to achieve the same effect, such as using pressure to squeeze the composite mixture through a narrow opening such as in injection molding.

The larger the random shaped fragment sizes distributed on the conveyor belt, or the more composite mixture or random shaped fragments that are piled up in front of the press roller relative to the distance between the press roller and the belt, the more deformed and stretched the composite mixture will become after passing through the press roller, or a pair of rollers. This will result in elongated veining that is somewhat controllably stretched or deformed depending on how much composite mixture or fragments are piled up in front of the press roller. If not enough composite mixture or fragments are piled up in front of the press roller, the amount the composite mixture or fragments are stretched or deformed will be minimal. To an extreme, if there is not enough composite mixture or fragments, the composite mixture or fragments will not compress to form one complete slab. If too much material is piled up in front of the press roller, the composite mixture or fragments will stretch too much. There is a specific amount of stretching or deformation desired depending on what final design aesthetic is required. In addition, the speed of the belt may be increased in order to cause more composite mixture or random shaped fragments to pile up in front of the press roller or slowed down to cause less composite mixture or random shaped fragments to pile up in front of the press roller.

The rotational speed of the press roller or pair of press rollers as well as the height between the belt and the press roller or the height between a pair of press rollers will also influence the degree of stretching or deformation of the composite mixture or fragments.

One or more embodiments of the present invention store and adjust variables in computer memory to control which colorant, the amount of each of the colorant, which region of the composite material for the colorant to be deposited when the colorant is to be deposited, and how much the composite material deforms and stretches after passing through one or more press rollers. The distance between the press roller and the belt, or the distance or the gap between a pair of rollers, the height and amount of fragments of composite material, and the speed of the belt feeding the press roller may all be controlled in at least one embodiment.

A significant advantage of the present invention is the ability to have a continuous run of material as opposed to forming slabs one at a time in the color formation process prior to vibration and compaction of the slab. In addition to cost savings it may be aesthetically advantageous to produce lengths of slabs longer than a standard slab length (where the standard slab length typically is between 1.5 meters to 3.8 meters). This is because if you were to produce a single slab, the degree of stretching present at the front or back of the slab may be significantly different than in the middle since there is not enough material accumulated in front of the press roller at these points. If for example a length of ten slabs were produced continuously, the material at the front and back of the length of slabs may be discarded and the remainder cut into 1.5 meters to 3.8 meter length increments for further processing.

Another significant advantage of the present invention is the ability to save material cost. It is very difficult to distribute material evenly throughout a large enough format such as the area of a slab, which may be 1.0 to 2.5 meters×1.8 to 3.8 meters with an example thickness of from 10.0 to 60.0 mm. The vibration and compaction step may level local regions out, however if one end of the slab has more material than the other end, it is difficult to level. In production the slabs are generally produced thicker than would otherwise be necessary in order to accommodate this unevenness, and grind the slab down to the correct size in a later step in the process. For example, if a final product thickness of 30.0 mm is desired, a slab thickness of 36.0 mm may be produced and later grinded and polished to 30.0 mm, wasting some of the additional 6.0 mm of material. By using a press roller or similar device to squeeze any excess material flat, it is possible to produce slabs that are much more consistent and flat compared to the prior art, allowing for the production of slabs thinner than 36.0 mm prior to grinding while still maintaining a final product thickness of 30.0 mm.

In at least one embodiment of the present invention, an inelastic protective film or a separation film such as a PET film may be placed on the surface of a supporting structure, such as a conveyor belt. Multiple layers of different composite material mixtures which may vary in color may be deposited onto the PET film to form a multi-colored layered mixture. These layers may be substantially horizontal, wherein each of the layers may vary between plus thirty degrees to minus thirty degrees of horizontal. The amount of material deposited in each layer may be controlled so the height of each layer is a desired thickness, and the thickness in different regions of the same layer may be controllably different. In some cases, some regions may have no additional material deposited on top of it to form another layer. The multi-colored layered mixture may be continuous along the length of the conveyor belt.

The multi-colored layered mixture may then be processed through a first press roller or a first pair of press rollers to press the multi-colored layered mixture into a damp, dense, uncured slab. The thickness of the uncured slab may be controlled by the height of the press roller, for example to be around 8.0 centimeters (cm). Notably the horizontal layers of colors are still embedded in the uncured slab.

A plurality of cutting devices, such as knives or circular blades like pizza cutters, may be installed onto a shifting structure. The distance between each cutting device may be adjustable. For example, if producing a 160.0 centimeters (cm) wide slab, the compressed layered mixture is 8.0 cm in thickness, a plurality of nineteen cutting devices 8.0 centimeters (cm) apart may be used. The shifting structure may be lowered so that the cutting devices are inserted into the damp, dense, uncured slab. As the conveyor belt moves the damp, dense, uncured slab downstream, the stationed cutting devices cut the damp, dense, uncured slab into a plurality of long strips. These long strips still have horizontal layers of colors embedded within them. The insertion depth may be controlled so that the cutting devices cut the entirety of the uncured slab, however not the PET film underneath.

After the damp, dense, uncured slab is cut into a plurality of strips, a corresponding plurality of devices similar to plowshares are positioned directly behind the circular blades and inserted into the plurality of strips. As the conveyor belt moves the strips downstream, the plowshare devices scoop up the corresponding strips so the strips are separated from the PET film underneath, shift to reposition the strips, rotate the strips about ninety degrees, and then drop the strips back onto the PET film, so that the horizontal layers of color are now vertical and visible from the top. The strips may be rotated more or less than the full ninety degrees. The degree of rotation may be between sixty degrees and one hundred and twenty degrees. This rotation between sixty and one hundred and twenty degrees may also achieve the desired layered aesthetic after the stretch press process. The depth the plowshare devices are inserted into the strips is approximately the distance between the PET film and the top of the strip. In addition, each of the plowshares may be configured to push the strips along the width of the conveyor belt so that each of the strips is displaced about half the width of the particular strip. After the ninety degree rotation and being dropped back onto the PET film, the strips will generally be placed back in its original position. The thickness of the layered material after the first stage press may be larger than the width of the strips that are cut from the layered material. For example, if a layered material has a thickness of 20.0 cm (centimeters) after the first stage press, the material may be cut into strips 10.0 cm (centimeters) wide. These strips may be rotated about ninety degrees to obtain a rotated plurality of strips, displaced so that each strip is a desired distance away from the other strips to obtain an arrangement of strips with a new height of 10.0 cm.

The plurality of plowshares may scoop up all of the corresponding strips at the same time, shift to reposition them, rotate them about ninety degrees, and drop them back down onto the PET film.

The cutting devices and the plowshares may be installed on the same shifting structure which may move back and forth along the width of the slab or conveyor belt. This movement back and forth, along with the material moved by the conveyor belt, may cause the cutting devices to carve and flip an s-shaped or wavelike pattern of strips.

The plurality of strips which have been carved, scooped up, repositioned, rotated about ninety degrees, and dropped back down onto the PET film may then be processed through a second press roller or a second pair of press rollers, or stretch press, to further press, flatten and stretch the plurality of strips into an uncured slab.

The subsequent uncured slab may be trimmed into a desired length, then undergo a process of vibration and compaction, cured, calibrated and polished, and trimmed again into a finished engineered stone slab.

In at least one embodiment, the cutting device and plowshare device may be combined into a single device and a plurality of this combined devices maybe used, that cuts the multi-colored layered mixture into strips, scoop up the strips, repositions and rotates the strips around ninety degrees, and drop the strips back down onto the PET film.

In at least one embodiment, the plurality of cutting devices and plowshare devices may be oriented so that each of the plurality of cutting devices and each of the plurality of plowshare device are positioned along a perpendicular line relative to the width of the conveyor belt.

In an alternative embodiment, each of the plurality of cutting devices and each of the plurality of plowshare devices may be staggered relative to the width of the conveyor belt so that each subsequent cutting and plowshare device acts on the composite materials slightly upstream or downstream from the subsequent devices.

DETAILED DESCRIPTION OF THE DRAWINGS

Figure 1:
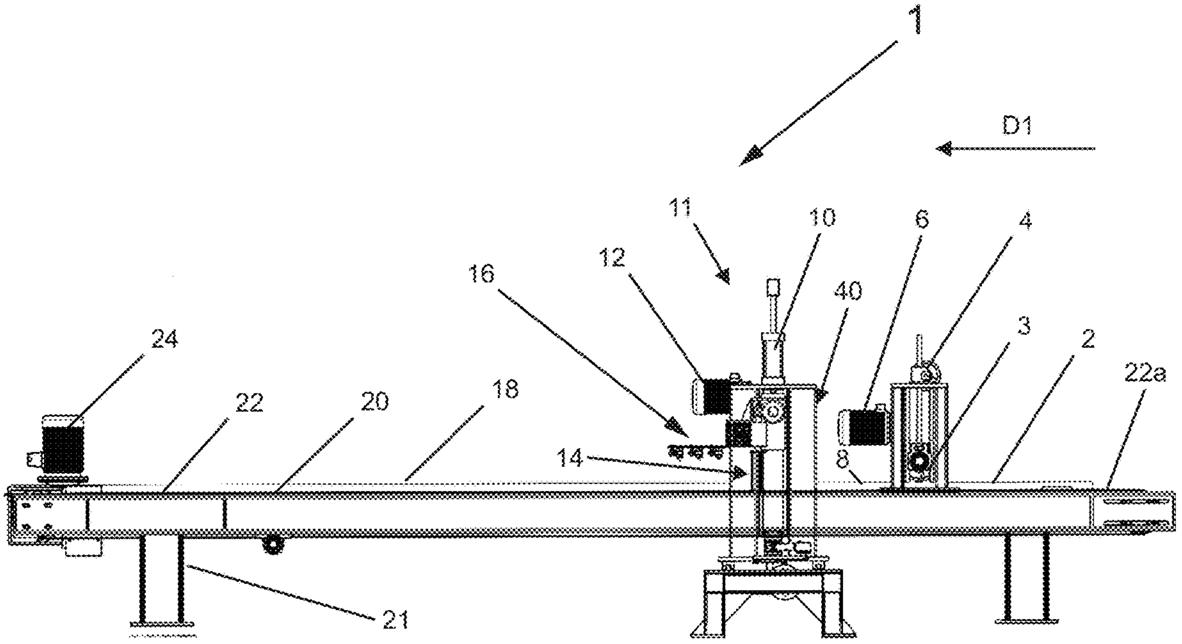
FIG. 1 shows a side view of an apparatus in accordance with an embodiment of the present invention in which stirring devices are used to disrupt a composite mixture which may be slightly pressed into a damp, dense, uncured slab, and subsequently spray devices are used to deposit colorant in specific regions of the disrupted fragments.

FIG. 1 shows a side view of an apparatus 1 in accordance with an embodiment of the present invention in which a composite mixture 2 enters from the right, moves in the direction D1 underneath a press roller 3. The press roller 3 is used to slightly press the composite material into a damp, dense, uncured slab 8 in the first stage press.

The slightly pressed, damp, dense uncured slab 8, which may be compressed by 10%-20% by volume compared to prior to pressing, is disrupted by a plurality of stirring devices 14. Next a plurality of spray devices 16 are used to deposit colorant in specific regions of the disrupted fragments. A composite material with wave shaped pattern 18 is formed.

The apparatus 1 includes press roller height adjustment mechanism 4, press roller driving mechanism 6, shifting structure height adjustment mechanisms 10 and 11 (shown in FIG. 2), stirring devices rotation mechanism 12, the plurality of stirring devices 14, the plurality of spray devices 16, PET film 20, conveyor belt 22, and conveyor belt driving mechanism 24, and shifting structure 40 which the plurality of stirring devices 14 are mounted to.

Figure 2:
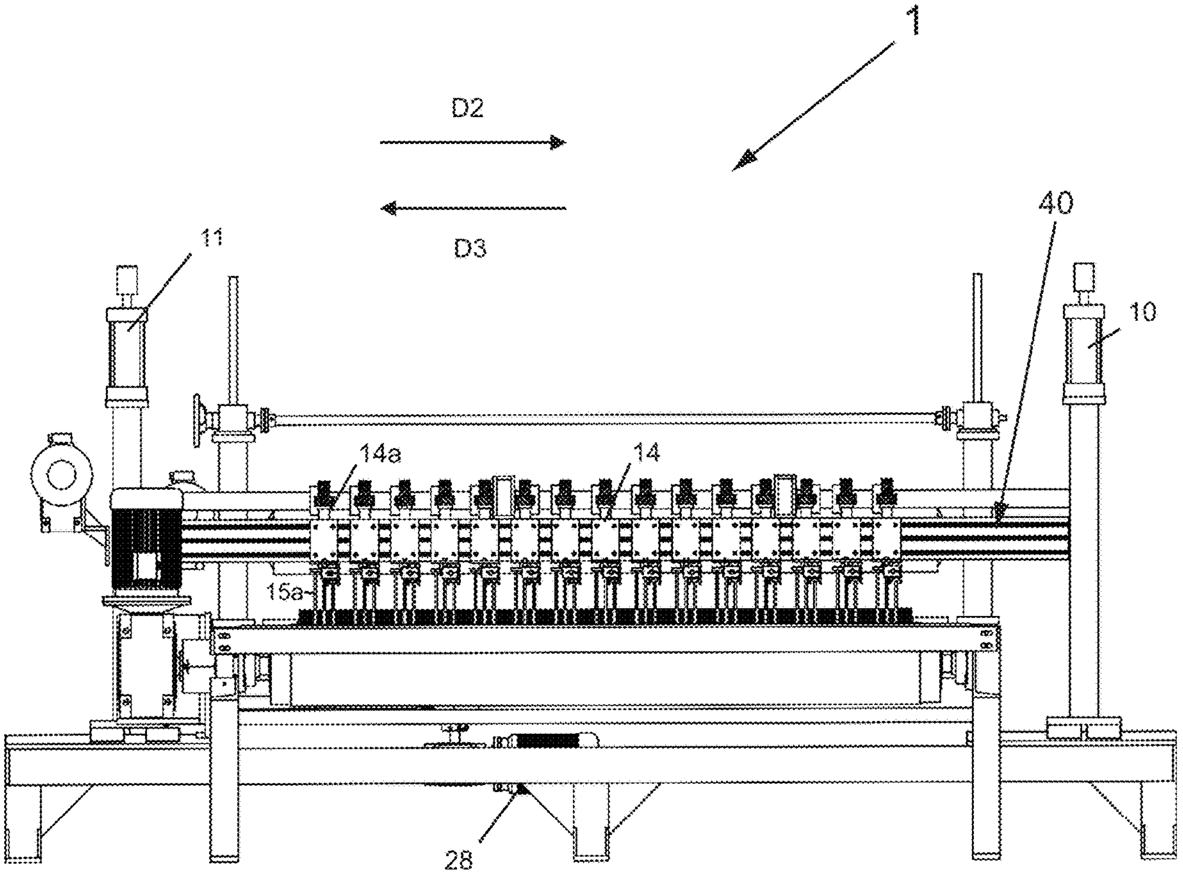
FIG. 2 shows a front view of the apparatus of FIG. 1, showing prongs of the stirring devices, which may be lowered into the slightly pressed uncured slab and rotated to disrupt the slab into fragments.

FIG. 2 shows a front view of the apparatus 1 of FIG. 1 seen from the left hand side of FIG. 1, showing prongs, such as prong **15*a* of stirring device 14*a* of the plurality of stirring devices 14, which may be lowered into the slightly pressed uncured slab 8 and rotated to disrupt the slab into fragments, shifting structure 40, and a mechanism 28 for moving the shifting structure 40, which moves the shifting structure 40 back and forth in the D2 and D3** directions.

Figure 3:
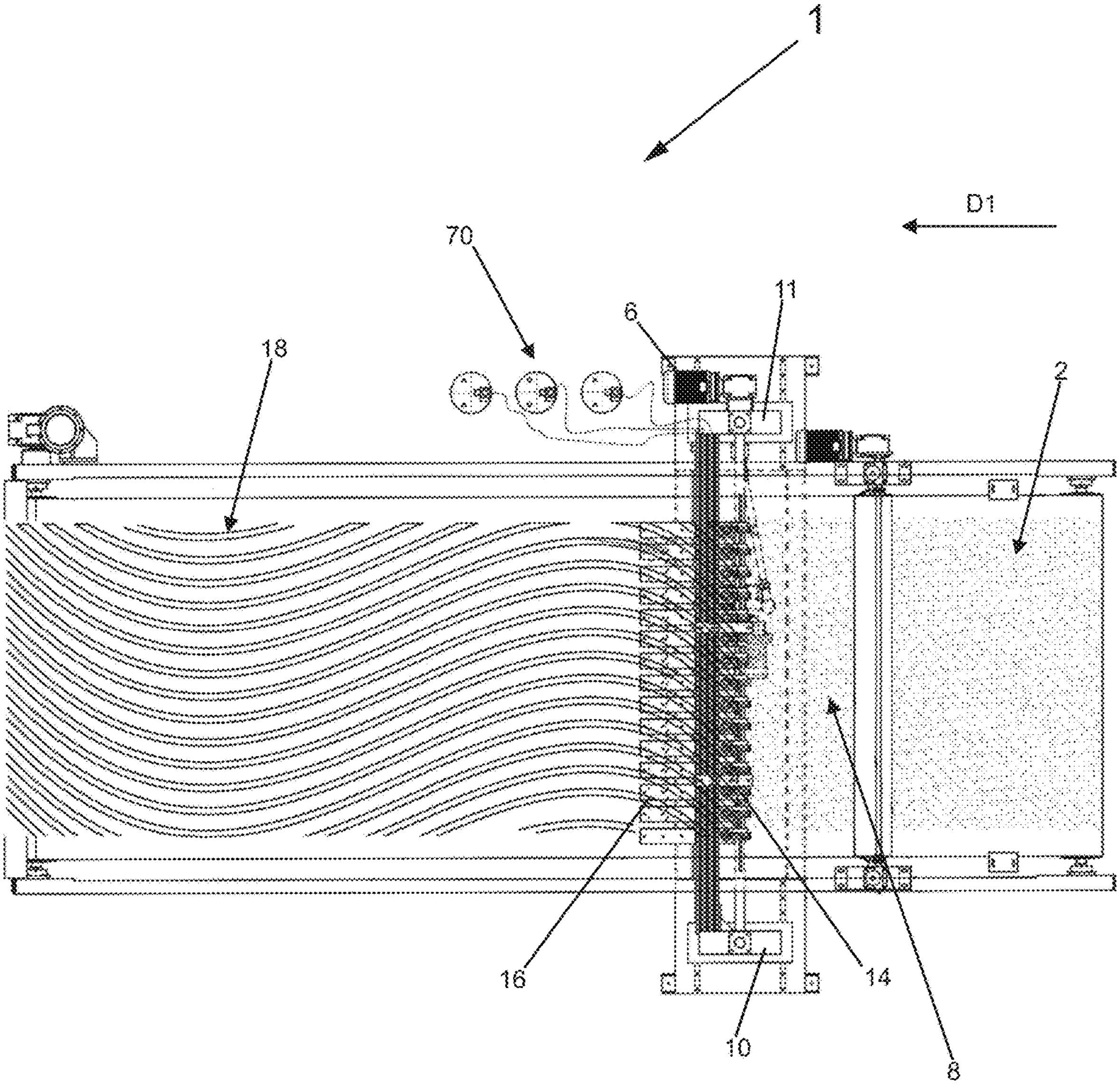
FIG. 3 shows a top view of the apparatus of FIG. 1, in which an uncured slab is disrupted by the stirring devices; in which spraying devices subsequently deposit colorant in a predefined pattern; and wherein example of a s-shaped or wave pattern is shown to illustrate the pattern which is formed by the stirring and spraying devices.

FIG. 3 shows a top view of the apparatus 1 of FIG. 1, in which the slightly pressed uncured slab 8 is disrupted by the plurality of stirring devices 14. Next, spraying devices 16 subsequently deposit colorant in a predefined pattern, drawn from a plurality of colorant reservoir tanks 70 (three colorant reserve tanks are shown in FIG. 3). An example of a s-shaped or wave pattern 18 is shown to illustrate the pattern which is formed by the combined action of the stirring devices 14, the spraying devices 16, the shifting structure 40, and the moving conveyor belt 22.

Figure 4:
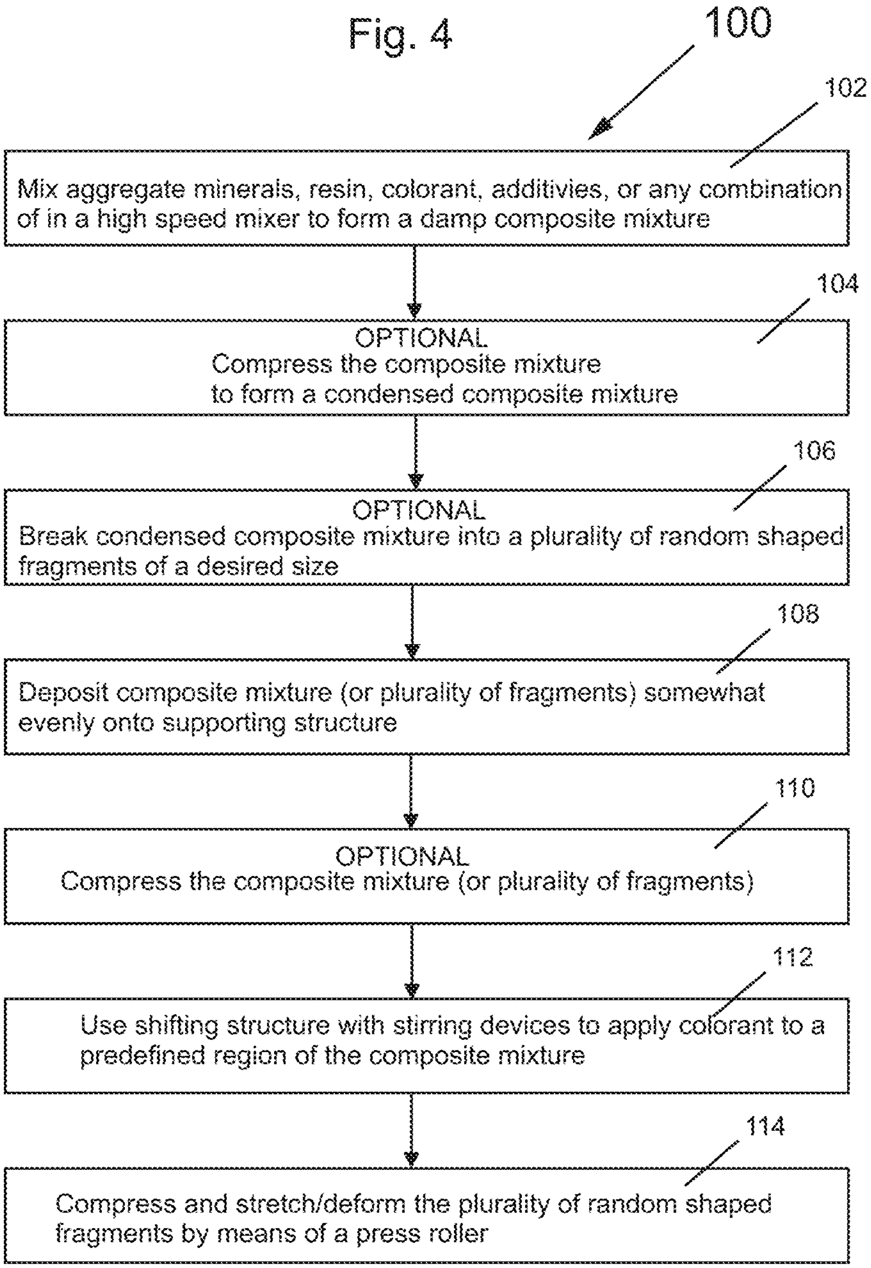
FIG. 4 shows a flow chart of a first further process for use with the apparatus of FIGS. 1-3 in accordance with an embodiment of the present invention.

FIG. 4 shows a flow chart 100 of a process for use with the apparatus 1 of FIGS. 1-3 in accordance with an embodiment of the present invention. The process of FIG. 4 starts at step 102 at which aggregate, minerals, resin, colorant, additives, or any combination of, are mixed in a high speed mixer to form a damp composite mixture as known in the art.

At step 104, the composite mixture is next optionally compressed to form a condensed composite mixture.

At step 106, the condensed composite mixture is next optionally broken into a plurality of random shaped fragments of a desired size. The condensed composite material may be broken into a plurality of fragments in a controlled manner such as by a stirring device to disrupt the condensed composite mixture in which the rotational speed of the stirring device may vary so that the faster the stirring device rotates to break the condensed composite material, the smaller the fragments will be. Alternatively, the condensed composite mixture may be dropped onto a rigid grid or sieve. By controlling the rigid grid or sieve size and/or height of the drop, it is possible to obtain fragments of a desired size or sizes. There are other means of obtaining these desired sized fragments.

Next, at step 108, the composite mixture (or plurality of fragments) is deposited somewhat evenly onto a supporting structure such as on the conveyor belt 22, at the end **22*a*, supported by a further support structure, shown in FIG. 1**.

Next, at step 110, the composite mixture (or plurality of fragments), such as composite mixture 2 is optionally slightly compressed such as by press roller 3 in FIG. 1 in a first stage press.

Next, at step 112, a shifting structure 40 with the plurality of stirring devices 14 and spray devices 16 attached to it are used to stir and apply colorant to a predefined region of the composite mixture as mechanism 28 moves the shifting structure 40 back and forth in the D2 and D3 directions, as shown in FIG. 2

Figure 9:
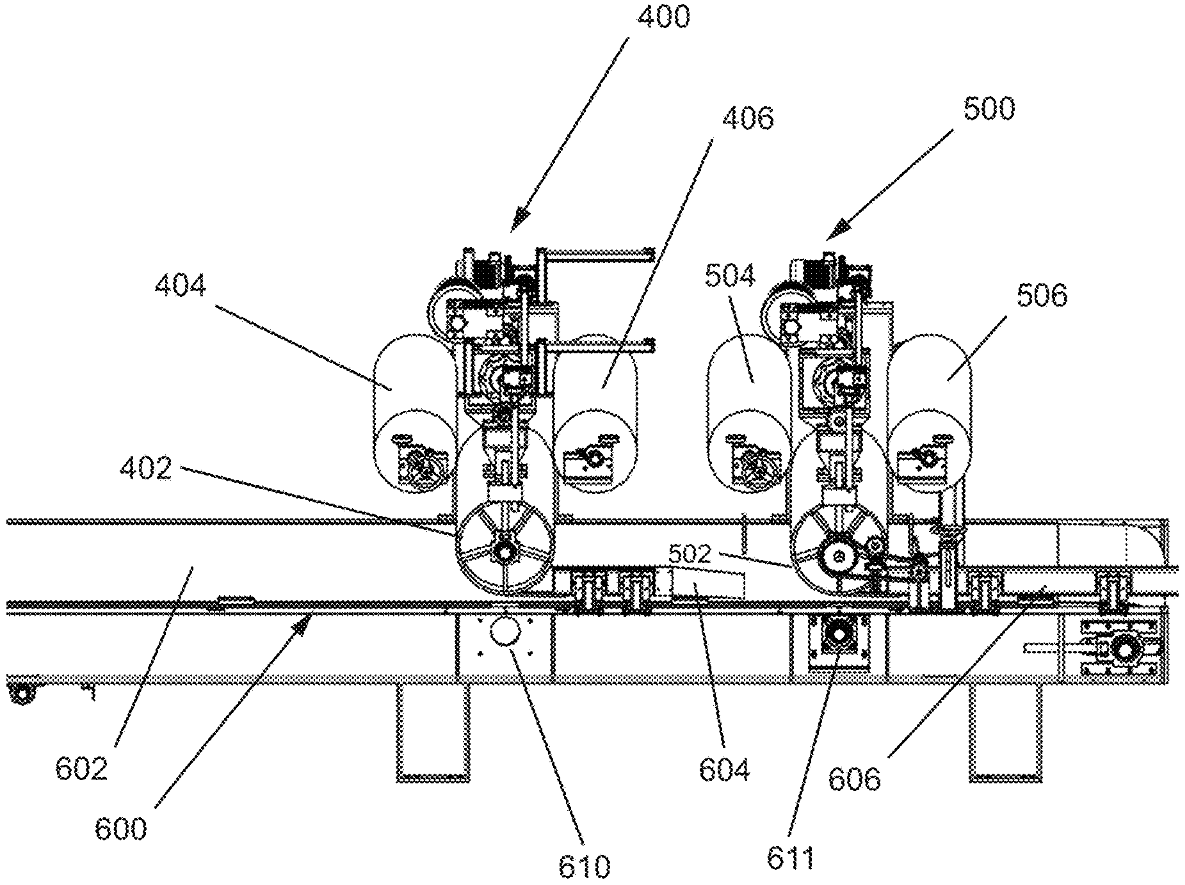
FIG. 9 shows a perspective view of an apparatus comprising two press rollers in accordance with at least one embodiment of the present invention.

Next at step 114, the plurality of random shaped fragments are compressed, and stretched/deformed by means of a press roller, such as press rollers 400 and 500 in FIG. 9 during a stretch press step.

Figure 5:
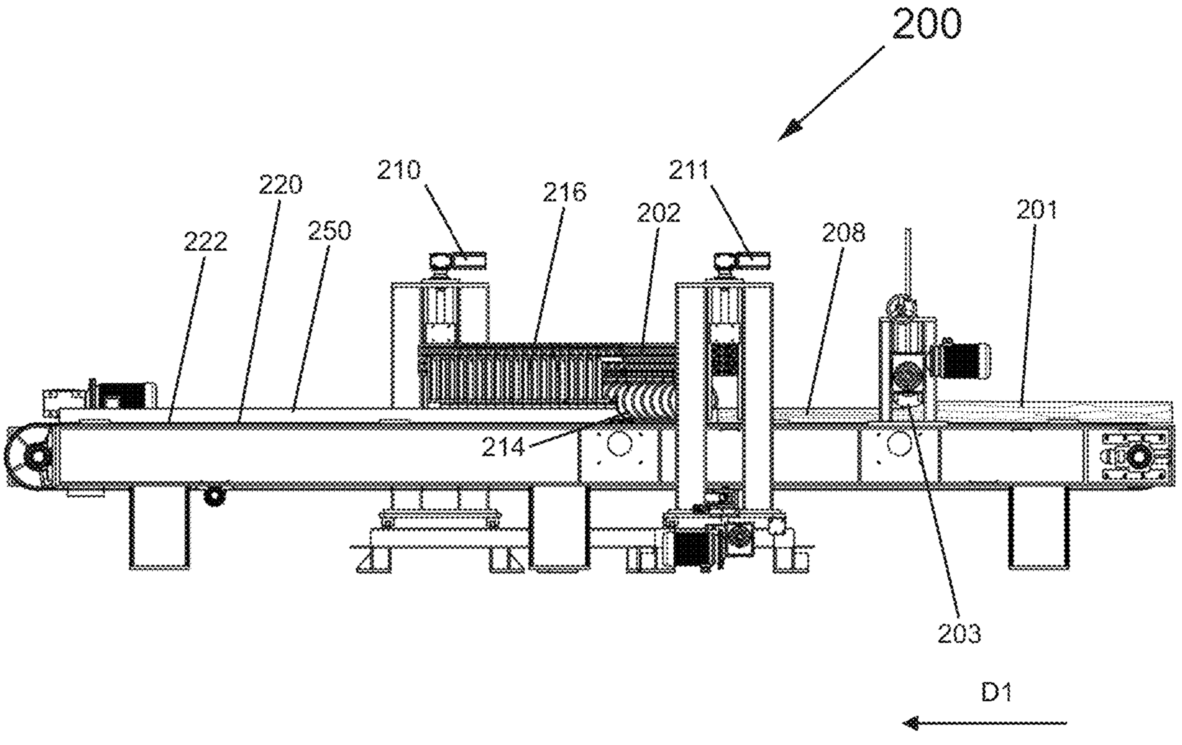
FIG. 5 shows a side view of an apparatus in accordance with an embodiment of the present invention in which carving devices are used to cut an uncured slab into strips, and subsequently plowshare devices are used to scoop up the strips from the supporting structure, shifting to reposition the strips, rotate the strips around ninety degrees, and subsequently depositing the strips onto the supporting structure.
Figure 6:
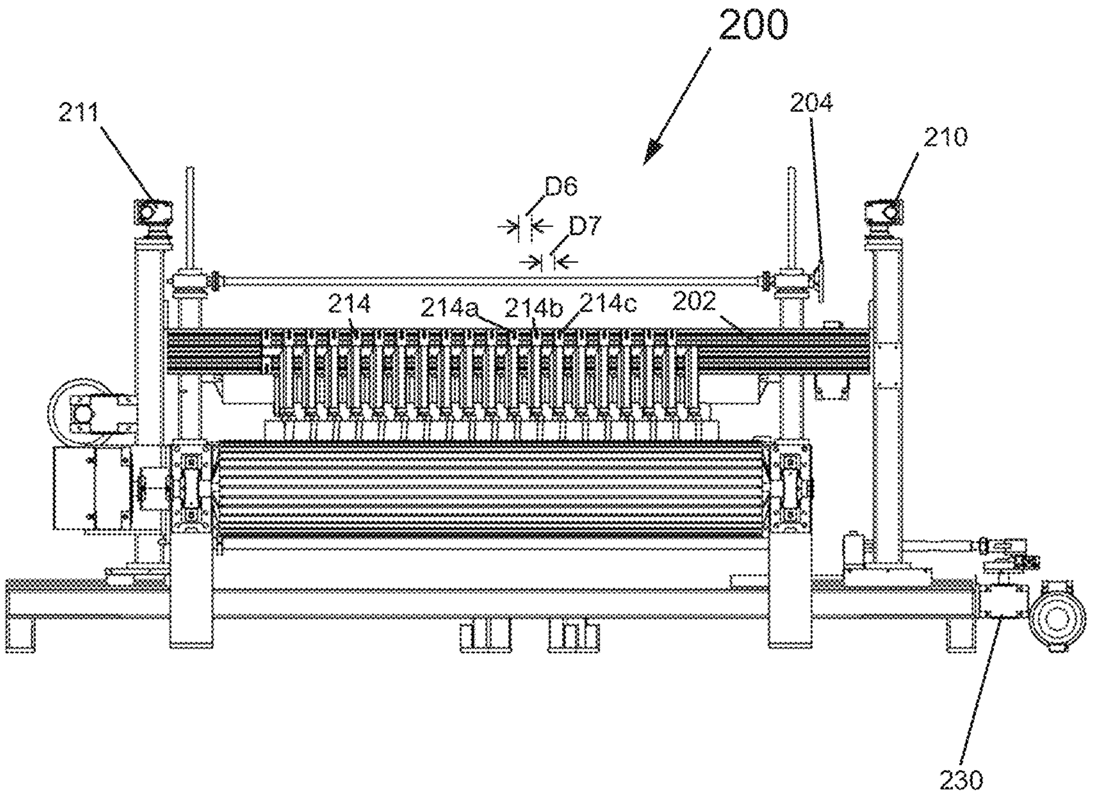
FIG. 6 shows a front view of the apparatus in FIG. 5, showing the plowshare devices scooping up, repositioning, rotating and depositing the strips.
Figure 7:
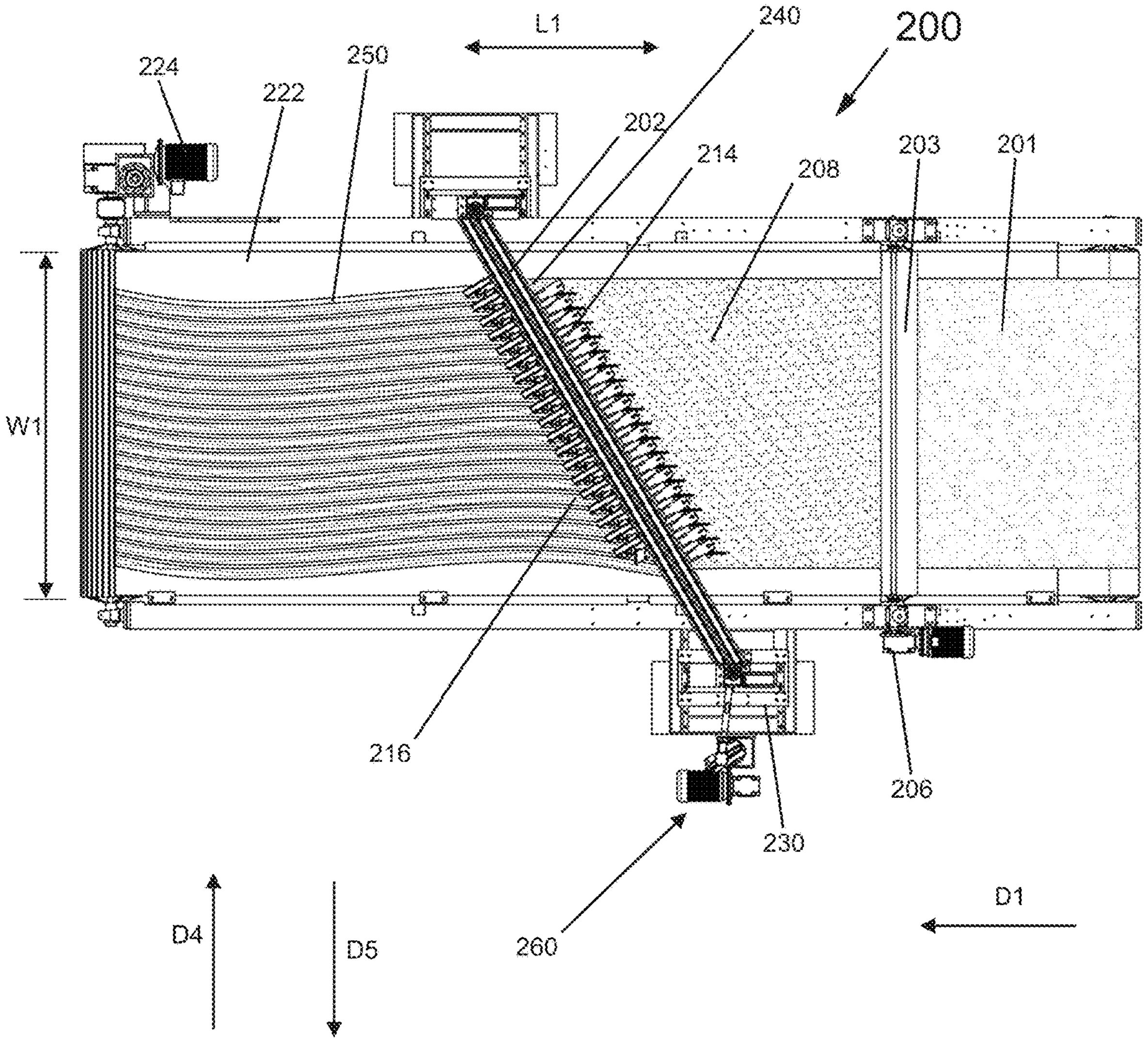
FIG. 7 shows a top view of the apparatus in FIG. 5, showing a multi-colored layered mixture of composite material being converted into vertically oriented strips.

FIG. 5 shows a side view of an apparatus 200 in accordance with an embodiment of the present invention. FIG. 6. shows a front view of the apparatus 200 of FIG. 5. FIG. 7 shows a top view of the apparatus 200 in FIG. 5.

The apparatus 200 shown in FIGS. 5-7 includes a shifting structure 202, a press roller 203, shifting structure height adjustment mechanisms 210-211, a plurality of carving devices 214, a plurality of plowshares 216, conveyor belt 222 which moves the material in the direction D1, supporting structure such as PET film 220, a mechanism 260 for moving one end 230 of shifting structure 202 back and forth in the D4 and D5 directions (thereby shifting the carving devices and plowshare devices to create a S shaped or wavelike pattern in the strips 250.

In at least one embodiment, the multi-colored layered composite mixture 201 is compressed by press roller 203 to form compressed multi-colored layered composite mixture 208, the plurality of carving devices 214 are used to cut the compressed multi-colored layered composite mixture 208 into strips 240 shown in FIG. 7, and then the plurality of plowshare devices 216 are used to scoop up the strips from the conveyor belt 222, driven by mechanism 224, to shift, reposition and rotate the strips 240 about ninety degrees and subsequently deposit the strips 250 back onto the conveyor belt.

Figure 8:
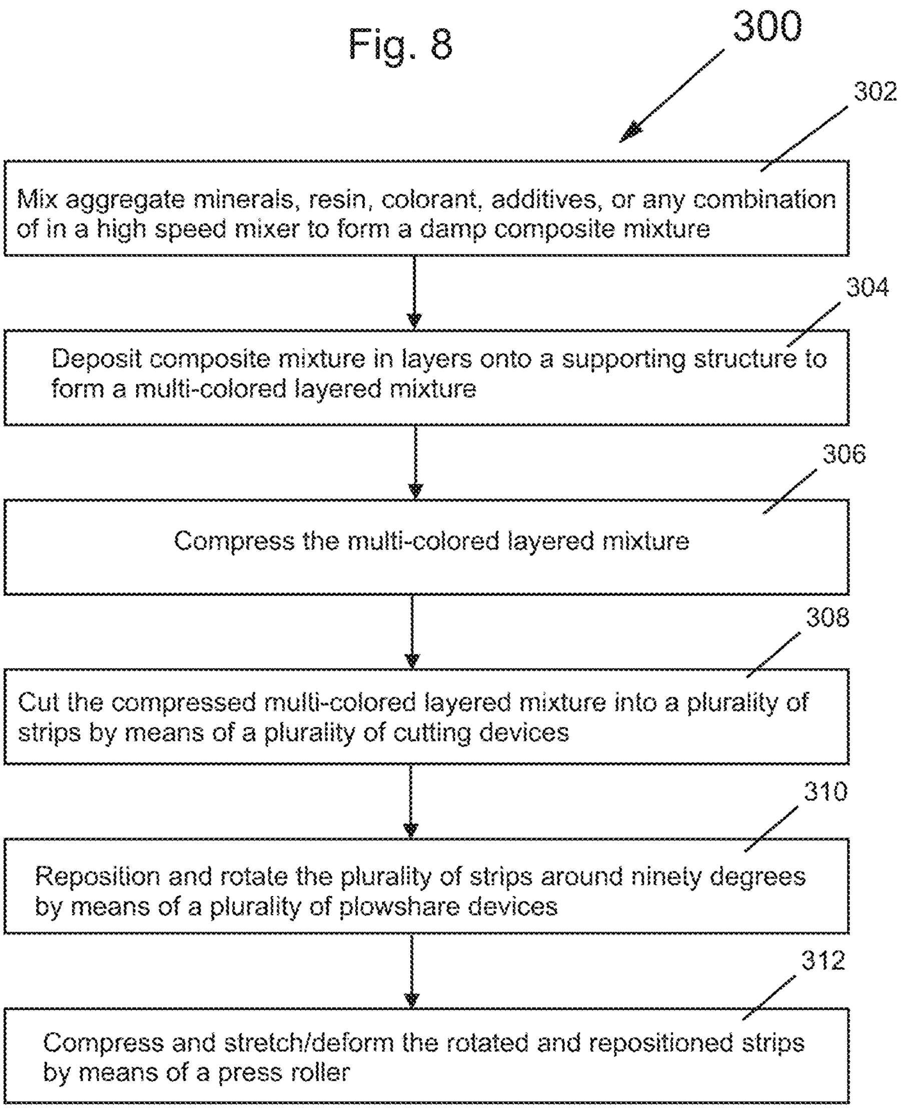
FIG. 8 shows a flow chart of a second further process for use with the apparatus of FIGS. 4-6 in accordance with an embodiment of the present invention.

FIG. 8 shows a flow chart 300 of a second process for use with the apparatus 200 of FIGS. 5-7 in accordance with an embodiment of the present invention.

The process shown in FIG. 8 starts with step 302, at which aggregate, minerals, resin, colorant, additives, or any combination of, are mixed in a high speed mixer to form a damp composite mixture as known in the art.

Next, at step 304, the composite mixture is deposited, such as composite mixture 201 shown in FIG. 7, in layers onto a supporting structure, such as onto conveyor belt 222 to form a multi-colored layered mixture.

Next, at step 306, the multi-colored layered mixture 201 is compressed, such as by roller 203, shown in FIG. 7 to form a compressed multi-colored layered mixture 208.

Next, at step 308, the mixture 208 is cut into a plurality of strips by a plurality of carving devices 214 shown in FIG. 7.

Next, at step 310, the plurality of strips are scooped up, repositioned, rotated about ninety degrees and place down onto the conveyor belt by a plurality of plowshare devices 216 to form rotated and repositioned strips 250 shown in FIG. 7.

The strips may be rotated to be horizontal with respect to ground plus or minus thirty degrees.

Next at step 312, the rotated and repositioned strips 250 are compressed and stretched/deformed by a press roller, such as press rollers 400 and 500 shown in FIG. 9, during a stretch press step.

FIG. 9 shows a perspective view of an apparatus comprising a first press roller device 400, a second press roller device 500, and a conveyor apparatus 600, which may be used during the stretch press step.

The first press roller device 400 includes rollers 402, 404, 406, and 610. The second press roller device includes rollers 502, 504, 506, and 611. The conveyor apparatus 600 includes conveyor belt 602, and guide rails 604 and 606 so material does not fall off the conveyor belt while being pressed.

Figure 10:
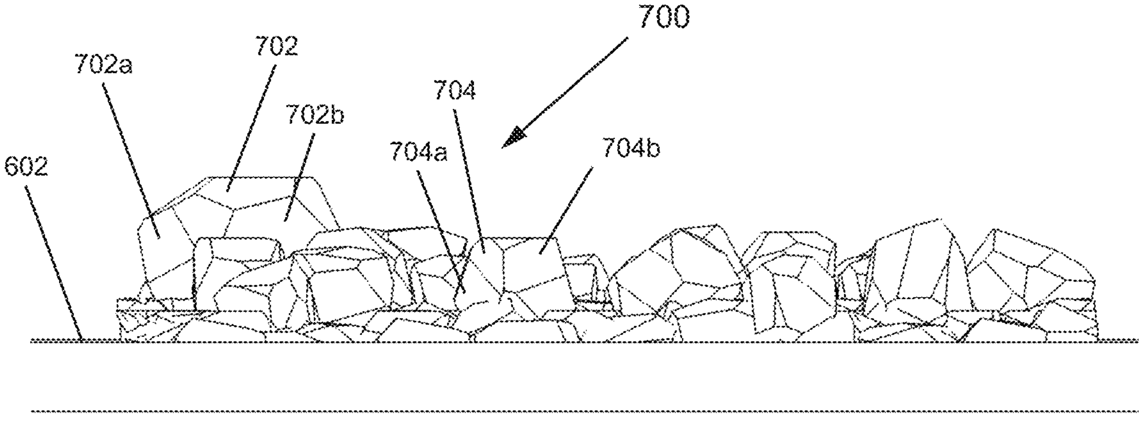
FIG. 10 shows a simplified side view of a composite material demonstrating various fragment sizes and random orientations of the sides of the fragments.

FIG. 10 shows a simplified side view of a composite material 700 on the conveyor belt 602, demonstrating various fragment sizes and random orientations of the sides of the fragments.

The composite material 700 includes fragments 702, and 704. Fragment 702 may include surfaces 702*a* and 702*b*. Fragment 704 may include surfaces 704*a* and 704*b*.

Figure 11:
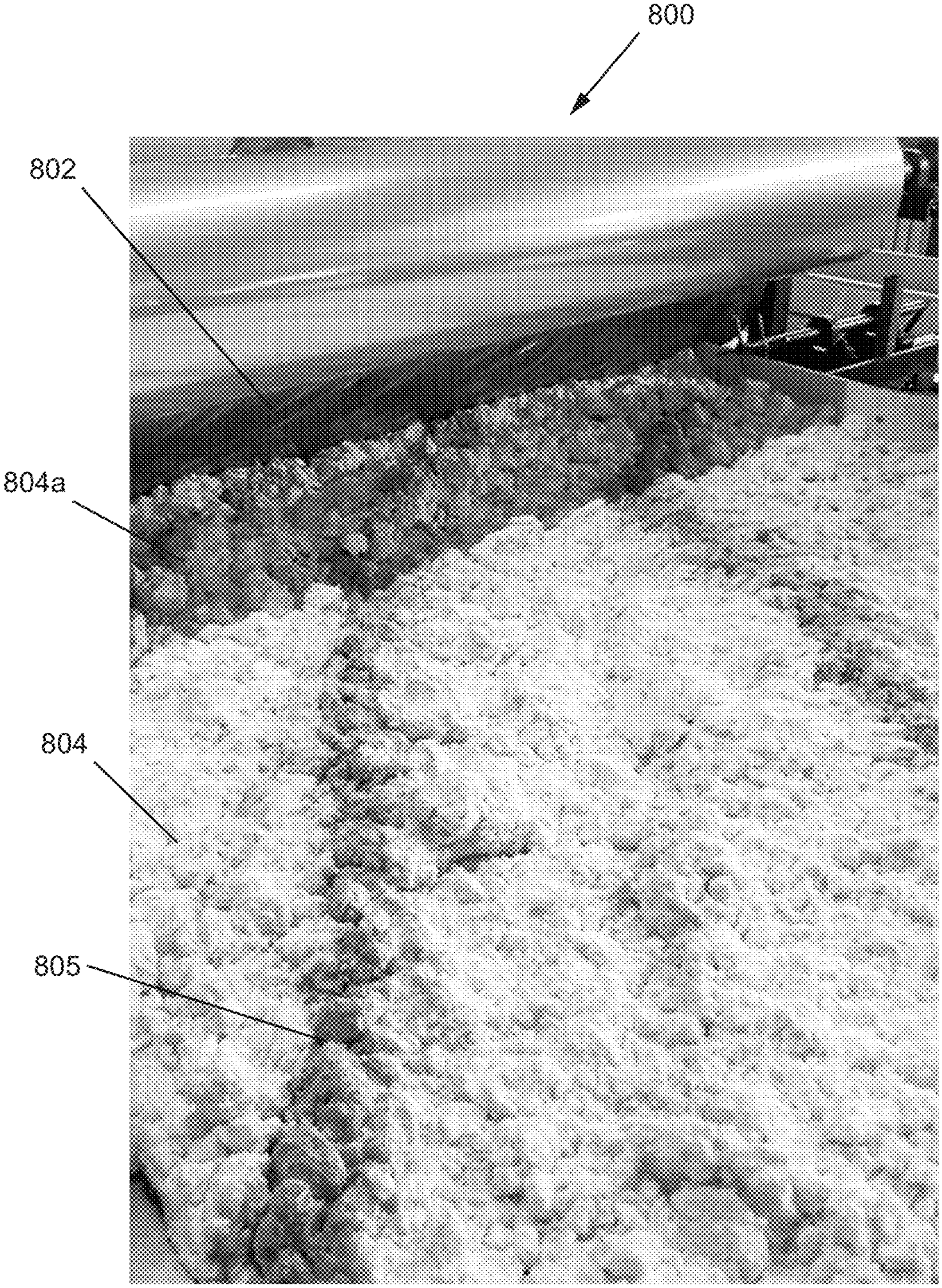
FIG. 11 shows a picture of fragments after a track of colorant has been applied as the fragments enter a press roller, and the extra amount of piled up fragments right in front of the press roller.

FIG. 11 shows a photograph 800 of fragments after a track of colorant has been applied as the fragments enter a press roller during the stretch press step, and the extra amount of piled up fragments right in front of the press roller. FIG. 11 shows fragments 804 after a track of colorant 805 has been applied before the fragments enter a press roller 802. A region 804*a* of fragments 804 is identified where the fragments of region 804*a* are "piled up".

Figure 12:
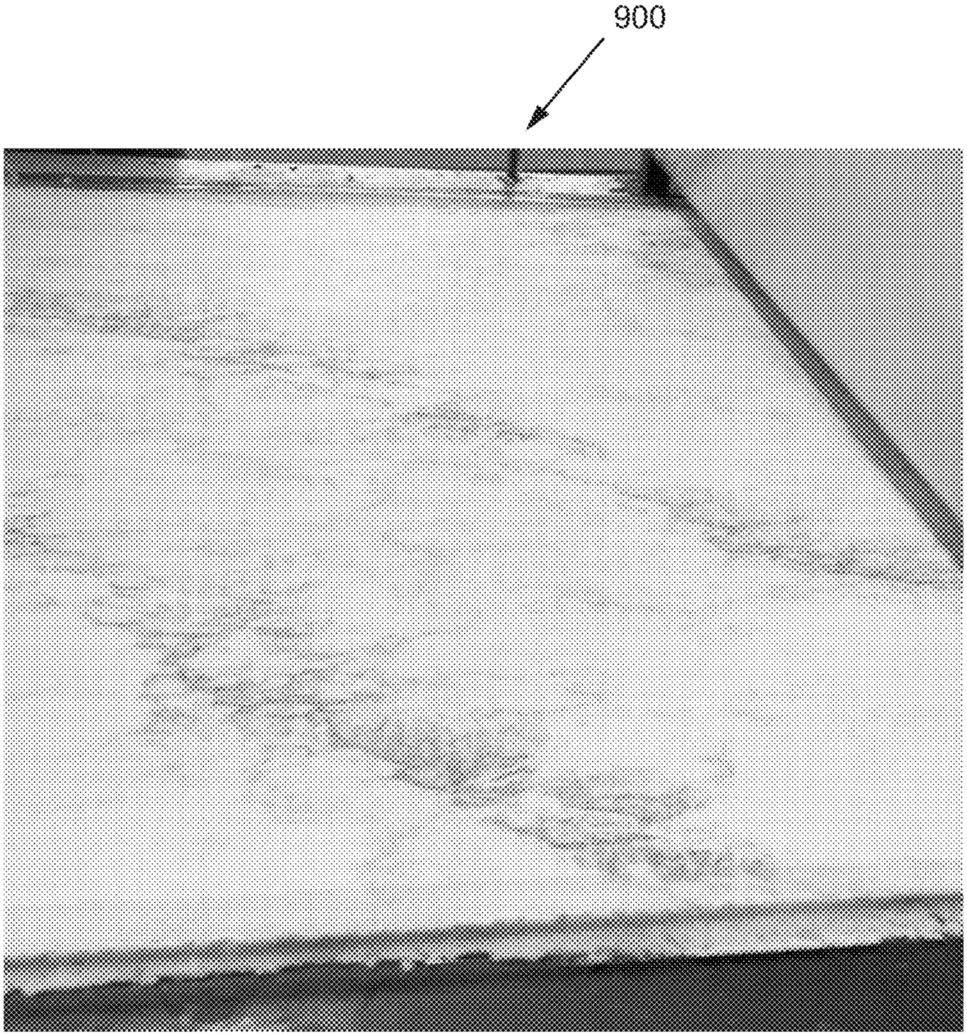
FIG. 12 shows fragments as they exit a press roller in which the fragments have been pressed together into one piece to form a flat slab, in which the fragments have been deformed and stretched, creating zig zagging through bodied veins in the slab.

FIG. 12 shows a photograph 900 of fragments as they exit a press roller during the stretch press step, such as press roller 400 in FIG. 9 in which the fragments have been pressed together into one piece to form a flat slab, in which the fragments have been deformed and stretched, creating zig zagging through bodied veins in the slab.

Figure 13:
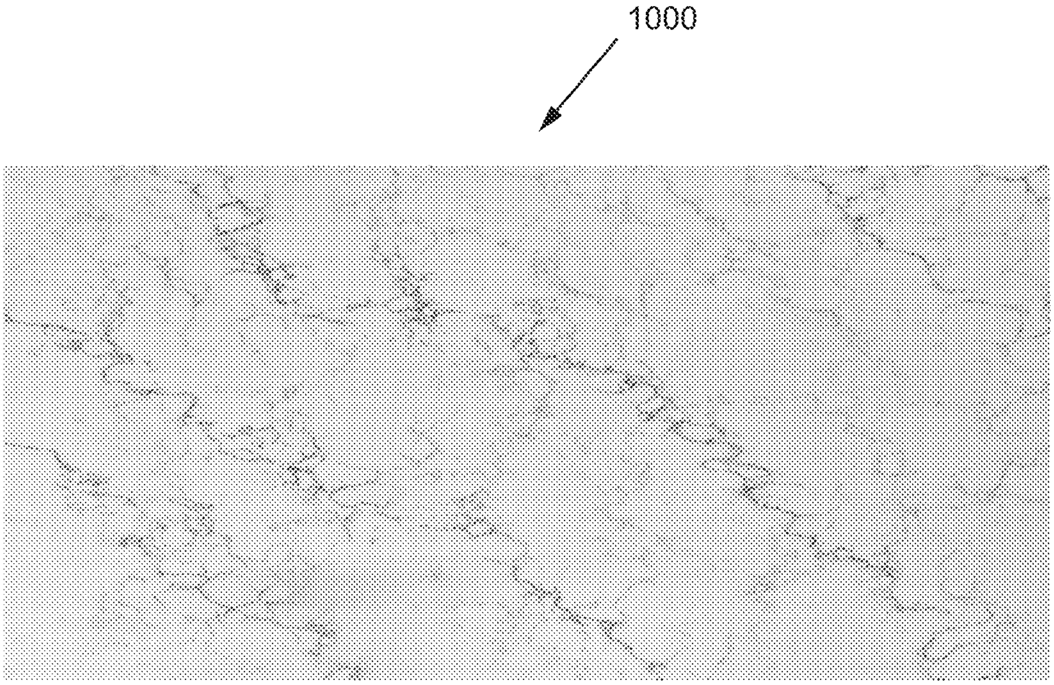
FIG. 13 shows a finished slab after trimming, grinding and polishing and undergoing the processes shown by FIG. 11 and FIG. 12.

FIG. 13 shows an image 1000 of a slab after trimming, grinding and polishing and undergoing the processes shown by FIG. 11 and FIG. 12.

Figure 14:
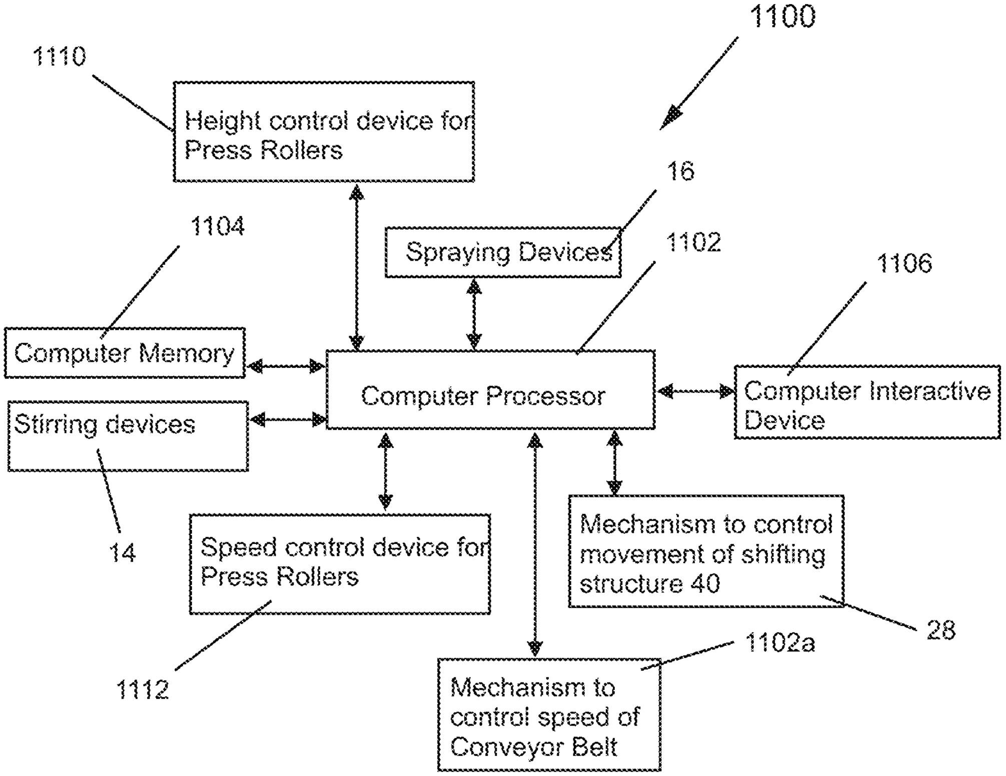
FIG. 14 shows a simplified block diagram of components for use with an embodiment of the present invention wherein stirring devices and spraying devices are used.

FIG. 14 shows a simplified block diagram 1100 of components for use with an embodiment of the present invention. The block diagram 1100 shows computer processor 1102, computer memory 1104, and computer interactive device 1106.

As shown in FIG. 14, the computer processor 1102 communicates with, at least, spraying device 16 (shown in FIG. 1), stirring devices 14 (shown in FIG. 1), speed control device 1112 (or devices) for press rollers 400 and 500, height control device 1110 for press rollers 402 and 502, a mechanism 1102*a* for controlling the speed of conveyor belt 22, and a mechanism 28 for controlling the movement of shifting structure 40 shown in FIG. 2.

Figure 15:
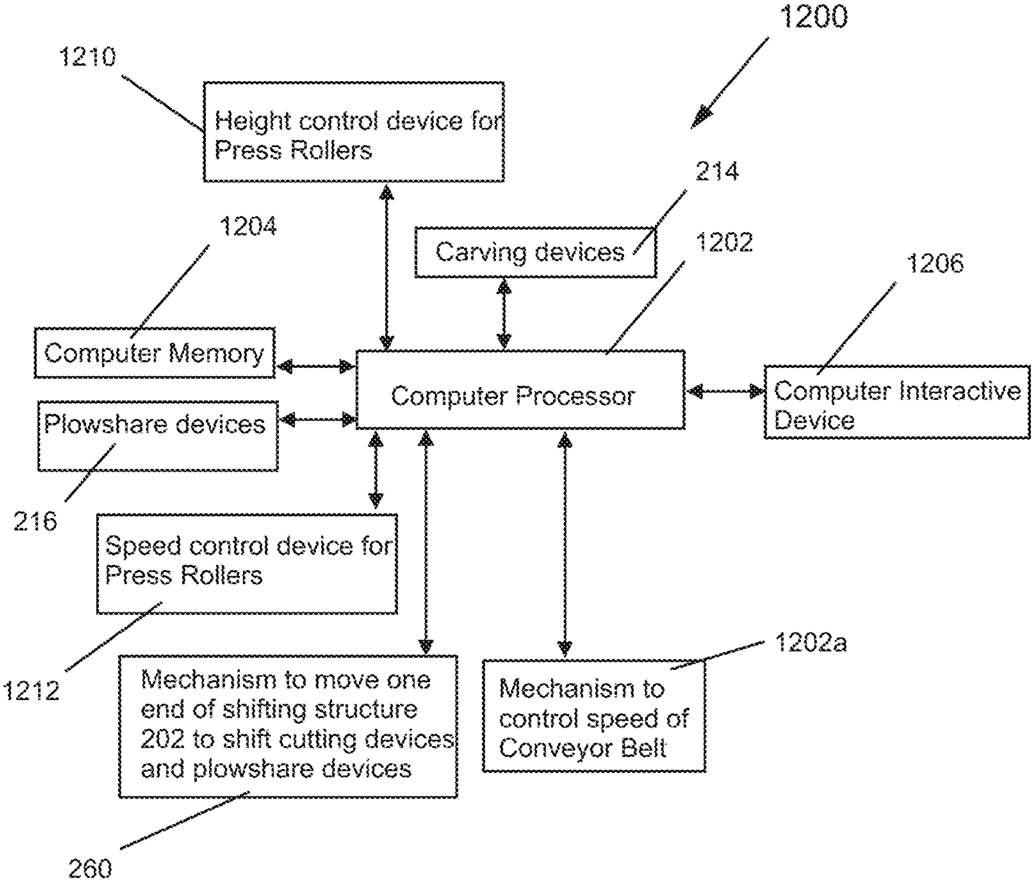
FIG. 15 shows a simplified block diagram of components for use with another embodiment of the present invention, wherein carving devices and plowshare devices are used.

FIG. 15 shows a simplified block diagram 1200 of components for use with an embodiment of the present invention. The block diagram 1200 shows computer processor 1202, computer memory 1204, and computer interactive device 1206.

As shown in FIG. 15, the computer processor 1202 communicates with, at least, carving devices 214 (shown in FIGS. 5-7), plowshare devices 216 (shown in FIGS. 5-7), speed control device 1212 (or devices) for press rollers 400 and 500, height control device 1210 for press rollers 402 and 502, a mechanism 1202*a* for controlling the speed of conveyor belt 222, and a mechanism 1208 for controlling the movement of shifting structure 202 shown in FIG. 6.

Figure 16:
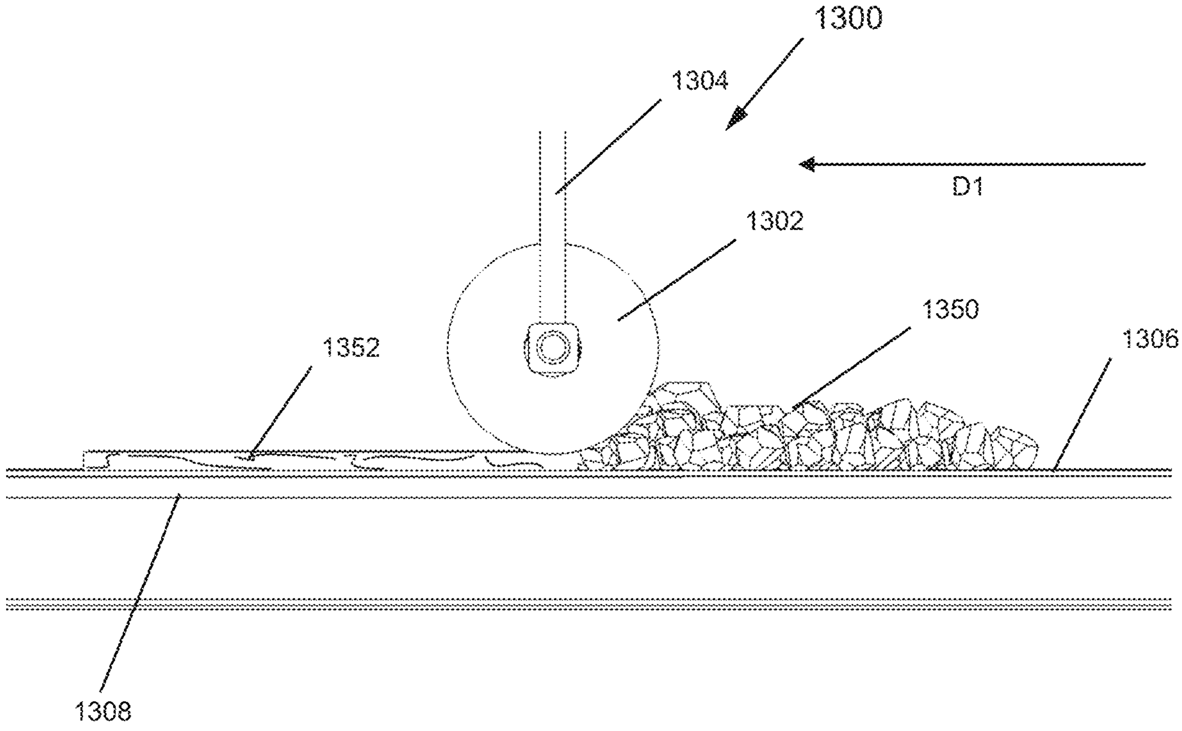
FIG. 16 shows a side view of a press roller in an embodiment of the present invention during operation in which fragments of composite material are being deformed, stretched and compressed into one piece to form a flat slab by the press roller.

FIG. 16 shows a side view of a press roller during the stretch press step in an embodiment of the present invention during operation in which fragments of composite material are being deformed, stretched and compressed into one piece to form a flat slab by the press roller;

FIG. 16 shows a simplified diagram 1300 of a side view of a press roller 1302 rotatably mounted to a member 1304 in an embodiment of the present invention during operation in which at least some of the plurality of fragments 1350 of a composite material are being compressed by the press roller 1302, and the remaining fragments of 1350 are going to be compressed as a conveyor belt 1306 moves in the direction D1 to move the fragments 1350 towards the roller 1302. The component 1352 represents fragments that have been compressed by the roller 1302 into a single piece with through bodied veins throughout the compressed, uncured slab. FIG. 16 also shows steel plate 1308 on which the conveyor belt 1306 moves.

Figure 17:
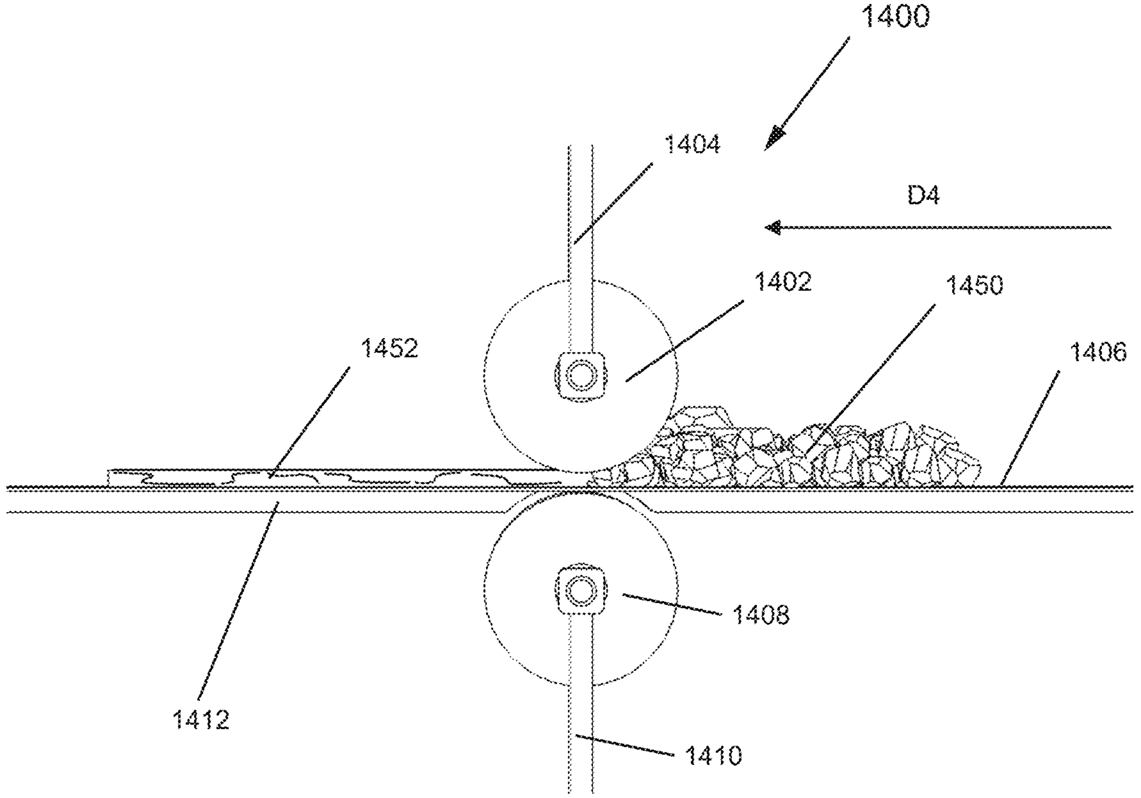
FIG. 17 shows a side view of a pair of press rollers for use in accordance with an embodiment of the present invention.

FIG. 17 shows a side view of a pair of press rollers in the stretch press step for use in accordance with an embodiment of the present invention.

FIG. 17 shows a simplified diagram 1400 of a side view of a press roller 1402 rotatably mounted to a member 1404 in an embodiment of the present invention during operation in which at least some of the plurality of fragments 1450 of a composite material are being compressed by the press roller 1402, and a press roller 1408 rotatably mounted to a member 1410, and the remaining fragments of 1450 are going to be compressed as a conveyor belt 1406 moves, in the direction D4 to move the fragments 1450 towards the gap between rollers 1402 and 1408. The component 1452 represents fragments that have been compressed by a combination of the rollers 1402 and 1408 into a single piece with through bodied veins throughout the compressed, uncured slab. FIG. 17 also shows steel plate 1412 on which the conveyor belt 1406 moves.

In the FIG. 17 embodiment, the press roller 1408 underneath the conveyor belt 1406 also rotates in order to assist in making sure there is not a braking effect due to the friction between the top press roller 1402 and the conveyor belt 1406.

In FIG. 1, the material 2 may be a damp composite material deposited onto the surface of a supporting structure such as a rubber mold or polyethylene terephthalate (PET) film on top of the conveyor belt 22, near end 22*a*.

FIG. 1 shows a shifting structure 40, which may include the plurality of stirring devices 14, a plurality of prongs 15, and a plurality of spraying devices 16.

The plurality of stirring devices 14 may be used to disrupt the composite mixture 2 as controlled by computer processor 1102 in FIG. 14 in accordance with computer software stored in computer memory 1104.

Each of the plurality of stirring devices 14 may be a device equipped with one or more rotatable prongs. The shifting structure 40, in at least one embodiment, is positioned along the width of the conveyor belt 22 shown in FIG. 1. A distance between each stirring device of the plurality of stirring devices 14, and every other stirring device of devices 14, is configured to be specified and controlled by the computer processor 1102 according to a desired final aesthetic.

In an alternative embodiment, each of the plurality of stirring devices 14 may be equipped with a means for moving any individual stirring device along the shifting structure.

The shifting structure 40 shown in FIG. 1, may move along the width of the conveyor belt 22 as driven by mechanism 28, thereby repositioning all the stirring devices 14 at the same time.

The shifting structure 40 is configured to be lowered by mechanisms 10 and 11, such as by the computer processor 1102 of FIG. 14, so that the plurality of stirring devices 14 are inserted into the composite mixture 8 (after optionally being pressing by roller 3 shown in FIG. 1). As the composite mixture 8 is transferred by the conveyor belt 22, the stirring devices 14 disrupt the composite mixture 8. The region of the composite mixture 8 that is disrupted by each stirring device 14 may be adjusted by the spacing between each stirring device 14, the width covered by the rotation of any individual stirring device 14*s* prongs 15 and the rotational speed of each of stirring devices 14, as controlled, for example, by computer processor 1102 of FIG. 14.

Colorant may be deposited into the disrupted regions of the composite mixtures 8 by a variety of methods such as by one or more of the plurality of spray devices 16, shown in FIG. 1, while the stirring devices 14 are disrupting the composite mixture 8 in order to simulate veining in natural stone. In an alternative embodiment, a plurality of further spray devices similar to spray devices 16 may also be positioned upstream or downstream of shifting structure 40 to deposit colorant before or after the composite mixture 8 are disrupted by the stirring devices 14. The amount of colorant deposited at any given point may be controlled, such as by computer processor 1102 depending on the desired final design of the slab. More than one kind of colorant may be deposited at any given region, and these multiple colorants may or may not be deposited at the same time. The amount of each colorant to be deposited may be controlled by a computer or the computer processor 1102.

In at least one embodiment, the shifting structure 40 is configured to move back and forth in the D2 and D3 directions along the width of the conveyor belt 22 as driven by mechanism 28, as the conveyor belt 22 transfers the composite mixtures downstream, and thereby the stirring devices 14 carve parallel s-shaped or wave shaped patterns in the composite mixtures 8. Depending on the design requirements, the distance the shifting structure 11 moves back and forth and the speed at which it moves is configured to be controlled, such as by a computer or computer processor 1102. This, along with controlling the conveyor belt 22 travel speed, will result in different S-shaped or wave shaped patterns in the processed material.

After the composite mixtures pass through the stirring devices 14, and colorant dispensing or spraying devices 16 shown in FIG. 1, the composite mixture 22 may then be compressed in a stretch press step by using a press roller or pair of press rollers such as 400 and 500 in FIG. 9 to press, flatten and stretch the composite mixtures into an uncured slab with the pattern of the colorant embedded within the slab. This uncured slab may then be trimmed to the dimensions of the desired final slab length, and then sent to a vacuum and compression machine for further processing.

In at least one embodiment of the present invention, the composite mixture may be slightly pressed in a first stage press by press roller 3 in FIG. 1, after being deposited (as material 2) onto the supporting structure or on conveyor belt 22 supported by table or support structure 21 into a compressed composite material 8 in the form of an uncured slab with a flatter surface prior to being disrupted by the stirring device or devices 14.

The stirring devices 14 then proceed to fragment the compressed composite material 8 and spray devices 16 apply colorant to the disrupted regions of the composite material, which is subsequently compressed in a stretch press step by using a press roller or pair of press rollers such as 400 and 500 in FIG. 9, to press, flatten and stretch the fragments into an uncured slab with the colorant veining embedded within the slab.

In at least one embodiment of the present invention, the composite material may be prepared as known in the art, such as shown at col. 1, line number 40 through col. 2, line number 30 and FIGS. 1-6 of U.S. Pat. No. 9,427,896 (hereinafter '896 patent), which is incorporated by reference herein, prior to being deposited onto conveyor belt 20.

These random shaped fragments of composite material are then evenly and/or loosely deposited onto a supporting structure such as a conveyor belt 22, supported by table or structure 21, so that there is not substantially more composite material in one region compared to another. An inelastic separation sheet, for example a sheet of PET film 20 shown in FIG. 1, may be used to separate the conveyor belt 22 from the damp mixtures or the damp fragments.

Ideally there are no regions where smaller fragments are significantly piled up next to a large fragment, thereby blocking the side walls of the large fragment from having colorant deposited onto it. In general, any region of square foot should not have 50% more material than another square foot region. In addition, if the random shaped fragments are piled up too high, the pressure may begin to compress the fragments together and lose their shape.

The advantage of processing and depositing the random shaped fragments composite material in this manner is that as the stirring devices 14, shown in FIG. 1, disrupt the fragments and colorant is applied by spraying devices 16, the colorant will be applied also to the side walls of the random shaped fragments. These side walls may be random shapes as opposed to smooth, flat surfaces. This leads to a greater surface area in which the colorant layer is applied compared to uncompressed composite material in which the particle size is significantly smaller. A higher rotational speed of the stirring devices 14 may partially break some of the fragments while a significantly lower rotational speed of the stirring device may just shift the fragments without breaking them.

During the stretch press step, when using the press roller 1300 in FIG. 16 or pair of press rollers 1400 in FIG. 17 in an alternative method, the amount of composite mixture or the number of random shaped fragments may vary, and the height of the composite mixture or random shaped fragments distributed onto the, may be greater or much greater than the specified distance between the press roller or pair of press rollers and the belt 22, as shown in 804*a* in FIG. 11. Therefore, when the composite mixture or random shaped fragments are fed through the press roller 1300, there will be an accumulation of material at the front of the press roller 1300.

The height of this accumulation may be controlled by a number of factors including belt speed, press roller rotational speed, height or average height of the composite mixture or random shaped fragments distributed on the belt, and distance between the press roller and the belt, all of which may be configured to be controlled by the computer processor 1102 of FIG. 14 in accordance with computer software stored in computer memory 1104.

In the case of embodiments having random shaped fragments, the larger random shaped fragments also have a tendency to be squeezed upstream, away from the press roller 1300 in FIG. 16, more towards regions with smaller or less random shaped fragments, therefore shifting the vein pattern created by the colorant deposited on the side walls of the random shaped fragments.

Notably, while covering more surface area of any particular random shaped fragment is desirable, coating more of the side walls, or vertical surfaces, of a random shaped fragment is also important, depending on the desired final design aesthetic. The press roller has a tendency to substantially stretch the damp composite mixture or the damp random shaped fragments in the horizontal direction, but very little stretching in the vertical direction. Therefore, if colorant is only on the top surface of the composite mixture or random shaped fragments, or if the composite material or random shaped fragments are slightly pressed with a flat top surface, the colorant will substantially remain on the top surface after passing through the press roller. For example, if a random shaped fragment has significantly more horizontal surface area such as a flat disc, all the colorant on the top surface of the disc will remain substantially on top after passing through the press roller. This will lead to the colorant appearing on the horizontal top surface of the slab as opposed to having a through bodied appearance in the vertical direction. If however the random shaped fragment is a cylinder with more height than width and colorant is applied throughout the height of the side walls, the colorant on the randomly shaped vertical surface will elongate in the horizontal direction after passing through the press roller and deformed. The subsequent appearance of the slab will not only have visible colorant veining on the horizontal surface, but also will have random veining through the body of the slab in the vertical direction.

There are other methods aside from press rollers in order to achieve the same effect, such as using pressure to squeeze the composite mixture through a narrow opening such as in injection molding.

The larger the random shaped fragment sizes distributed on the conveyor belt, or the more composite mixture or random shaped fragments that are piled up in front of the press roller relative to the distance between the press roller and the belt, the more deformed and stretched the composite mixture will become after passing through the press roller, or a pair of rollers.

This will result in elongated veining that is somewhat controllably stretched or deformed depending on how much composite mixture or fragments are piled up in front of the press roller. If not enough composite mixture or fragments are piled up in front of the press roller, the amount the composite mixture or fragments are stretched or deformed will be minimal. To an extreme, if there is not enough composite mixture or fragments, the composite mixture or fragments will not compress to form one complete slab. If too much material is piled up in front of the press roller, the composite mixture or fragments will stretch too much. There is a specific amount of stretching or deformation desired depending on what final design aesthetic is required. In addition, the speed of the belt may be increased in order to cause more composite mixture or random shaped fragments to pile up in front of the press roller or slowed down to cause less composite mixture or random shaped fragments to pile up in front of the press roller.

The rotational speed of the press roller or pair of press rollers as well as the height between the belt and the press roller or the height between a pair of press rollers will also influence the degree of stretching or deformation of the composite mixture or fragments.

One or more embodiments of the present invention store and adjust variables in computer memory 1104 shown in FIG. 14 or 1204 shown in FIG. 15, to control which colorant, the amount of each of the colorant, which region of the composite material for the colorant to be deposited when the colorant is to be deposited, and how much the composite material deforms and stretches after passing through one or more press rollers. The distance between the press roller and the belt, or the distance or the gap between a pair of rollers, the height and amount of fragments of composite material, and the speed of the belt feeding the press roller may all be controlled in at least one embodiment.

A significant advantage of the present invention is the ability to have a continuous run of material as opposed to forming slabs one at a time in the color formation process prior to vibration and compaction of the slab. In addition to cost savings it may be aesthetically advantageous to produce lengths of slabs longer than a standard slab length (where the standard slab length typically is between 1.5 meters to 3.8 meters). This is because if you were to produce a single slab, the degree of stretching present at the front or back of the slab may be significantly different than in the middle since there is not enough material accumulated in front of the press roller at these points. If for example a length of ten slabs were produced continuously, the material at the front and back of the length of slabs may be discarded and the remainder cut into 1.5 meters to 3.8 meter length increments for further processing.

Another significant advantage of the present invention is the ability to save material cost. It is very difficult to distribute material evenly throughout a large enough format such as the area of a slab, which may be 1.0 to 2.5 meters×2.0 to 3.8 meters with an example thickness of from 10.0 to 60.0 mm. The vibration and compaction step may level local regions out, however if one end of the slab has more material than the other end, it is difficult to level. In production the slabs are generally produced thicker than would otherwise be necessary in order to accommodate this unevenness, and grind the slab down to the correct size in a later step in the process. For example, if a final product thickness of 30.0 mm is desired, a slab thickness of 36.0 mm may be produced and later grinded and polished to 30.0 mm, wasting some of the additional 6.0 mm of material. By using a press roller or similar device to squeeze any excess material flat, it is possible to produce slabs that are much more consistent and flat compared to the prior art, allowing for the production of slabs thinner than 36.0 mm prior to grinding while still maintaining a final product thickness of 30.0 mm.

In at least one embodiment of the present invention, an inelastic protective film or a separation film such as a PET film 20 may be placed on the surface of a supporting structure, such as the conveyor belt 22 in FIG. 1 or 222 in FIGS. 5-7. Multiple layers of different composite material mixtures which may vary in color may be deposited onto the PET film 220 to form a multi-colored layered mixture. The amount of material deposited in each layer may be controlled so the height of each layer is a desired thickness, and the thickness in different regions of the same layer may be controllably different. In some cases, some regions may have no additional material deposited on top of it to form another layer. The multi-colored layered mixture may be continuous along the length of the conveyor belt 222.

The multi-colored layered mixture may then be processed through a press roller 203 shown in FIGS. 5-7 to press the multi-colored layered mixture into a damp, dense, uncured slab. The thickness of the uncured slab may be controlled by the height of the press roller, for example to be around 8.0 centimeters (cm). Notably the horizontal layers of colors are still embedded in the uncured slab.

A plurality of cutting devices, or carving devices 214, such as knives or circular blades like pizza cutters, may be installed onto a shifting structure, such as on structure 202 shown in FIGS. 5-7. The distance between each cutting or carving device of 214 and every other carving device, may be adjustable. For example, if producing a 160.0 centimeters (cm) wide slab, a plurality of nineteen cutting or carving devices (for carving devices 214) 8.0 centimeters (cm) apart may be used. For example, referring to FIG. 6, the carving devices 214 may include carving devices 214*a*, 214*b*, and 214*c*. The carving device 214*b* may be separated from the carving device 214*a* by a distance D6. The carving device 214*b* may be separated from the carving device 214*c* by a distance D7.

The shifting structure 202 may be lowered so that the cutting devices are inserted into the damp, dense, uncured slab 208 shown in FIG. 7. As the conveyor belt 222 moves the damp, dense, uncured slab 208 downstream in the direction D1, the stationed cutting devices or carving devices 214, cut the damp, dense, uncured slab 208, shown in FIG. 7 into a plurality of long strips 240. These long strips 240 still have horizontal layers of colors embedded within them. The insertion depth may be controlled so that the cutting or carving devices 214 cut the entirety of the uncured slab 208, however not the PET film 220 underneath, shown by FIG. 5.

After the damp, dense, uncured slab is cut into a plurality of strips 240, a corresponding plurality of devices similar or identical to a plurality of plowshares 216 are positioned directly behind the circular blades of carving device 214 and inserted into the plurality of strips 240. As the conveyor belt 222 moves the strips downstream, in the direction D1, the plowshare devices 216 scoop up the corresponding strips 240, so the strips 240 are separated from the PET film 220 underneath. The strips are shifted, repositioned, rotated about ninety degrees, and then dropped back onto the PET film 220 so that the strips with horizonal layers of color are now strips with vertical layers of color visible from the top 250. The depth the plowshare devices 216 are inserted into the strips 240 is approximately the distance between the PET film 220 and the top of the strip 240. In addition, each of the plowshares 216 may be configured to shift the strips 240 along the width of the conveyor belt 222 so that each of the strips 240 is displaced about half the width of the particular strip. After the ninety degree rotation and being dropped back onto the PET film 220, the strips 250 may be placed back in their original position.

The plurality of plowshares 216 may scoop up all of the corresponding strips 240 at the same time, shift to reposition them along the width of the conveyor belt 222, rotate them about ninety degrees, and drop them back down onto the PET film 220.

The cutting or carving devices 214 and the plowshares 216 may be installed on the same shifting structure 202 which may move back and forth by mechanism 260 which may travel in the D4 and D5 directions along the length of the conveyor belt 222 in order to move the carving devices 214 and plowshares 216. This movement back and forth, along with the material moved by the conveyor belt 222, may cause the cutting devices 214 and the plowshare devices to carve and flip an s-shaped or wavelike pattern of strips 250 shown in FIG. 7.

The plurality of strips 250 which have been carved, scooped up, repositioned, rotated about ninety degrees, and dropped back down onto the PET 220 film may then be processed through a stretch press step using press roller such as 1300 shown in FIG. 16 or a pair of press rollers such as 1400 shown in FIG. 17 to further press, flatten and stretch the plurality of strips into an uncured slab.

The subsequent uncured slab may be trimmed into a desired length, then undergo a process of vibration and compaction, cured, calibrated and polished, and trimmed again into a finished engineered stone slab.

In at least one embodiment, the cutting devices 214 and plowshare devices 216 may be combined into a single device and a plurality of the combined devices maybe used, that cuts the multi-colored layered mixture into strips, scoop up the strips, repositions and rotates the strips around ninety degrees, and drop the strips back down onto the PET film 220.

In at least one embodiment, the plurality of cutting devices 214 and plowshare devices 216 may be oriented so that each of the plurality of cutting devices 214 and each of the plurality of plowshare devices 216 are positioned along a perpendicular line, L1, relative to the width, W1, shown in FIG. 7, of the conveyor belt 222.

In an alternative embodiment, each of the plurality of cutting devices 214 and each of the plurality of plowshare devices 216 may be staggered relative to the width of the conveyor belt 222 so that each subsequent cutting device of devices 214 and plowshare device of devices 216 acts on the composite materials slightly upstream or downstream from the subsequent devices.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A method for producing engineered stone slabs comprising the steps of:

depositing a plurality of layers of composite material onto a supporting structure to form a multi-colored layered mixture;

compressing the multi-colored layered mixture to form a compressed, multi-colored layered mixture;

cutting the compressed, multi-colored layered mixture into a plurality of strips;

rotating and repositioning at least some of the plurality of strips so that at least some of the multi-colored layers of at least some of the plurality of strips are visible from a top or bottom surface view of the plurality of strips; and using a first device to press, flatten and stretch the composite material into a slab.

2. The method of claim 1 wherein at least some of the plurality of strips are rotated about ninety degrees.

3. The method of claim 1 wherein;

the step of cutting the compressed, multi-colored layered mixture is performed by a plurality of cutting devices.

4. The method of claim 1 wherein;

the step of rotating and repositioning at least some of the plurality of strips is performed by a plurality of plowshare devices.

5. The method of claim 1 further comprising;

the steps of cutting, rotating and repositioning at least some of the plurality of strips is performed by a plurality of cutting devices and a plurality of plowshare devices; and wherein the cutting devices are mounted on a shifting structure, and move along the width of the plurality of strips.

6. The method of claim 5 wherein;

wherein a plurality of plowshare devices are mounted onto the shifting structure.

7. The method of claim 5 further comprising;

the plurality of plowshare devices in combination with the plurality of cutting devices cut the compressed, multi-colored layered mixture into strips prior to rotating and repositioning at least some of the plurality of strips.

* * * * *